No. 734,080. PATENTED JULY 21, 1903.
W. MORRISON.
REAR AXLE CONSTRUCTION FOR AUTOMOBILES.
APPLICATION FILED APR. 24, 1903.
NO MODEL. 3 SHEETS—SHEET 1.

WITNESSES:
JB Weir
Robert H. Weir

INVENTOR:
William Morrison
By Buckley & Durand
Attys.

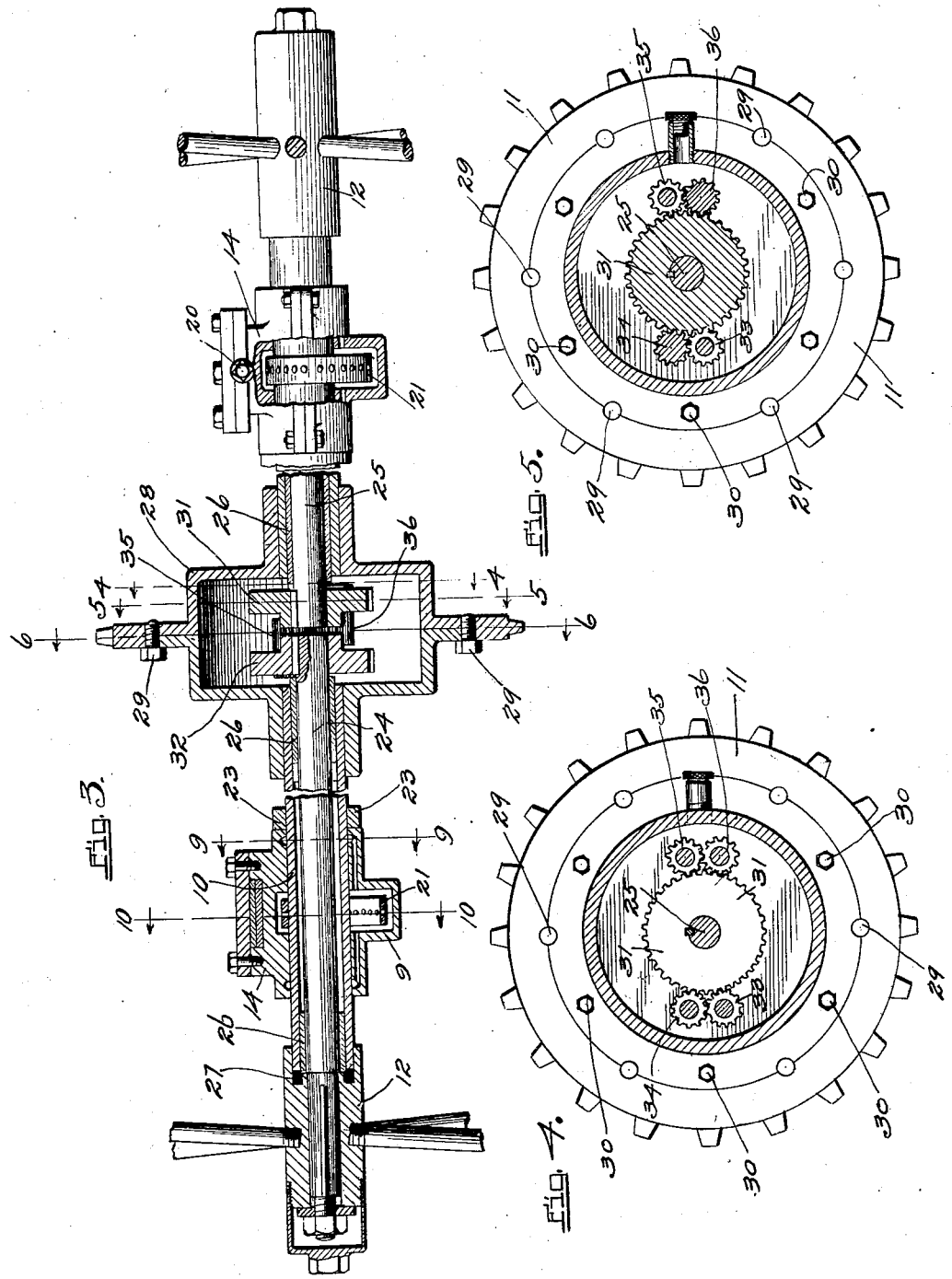

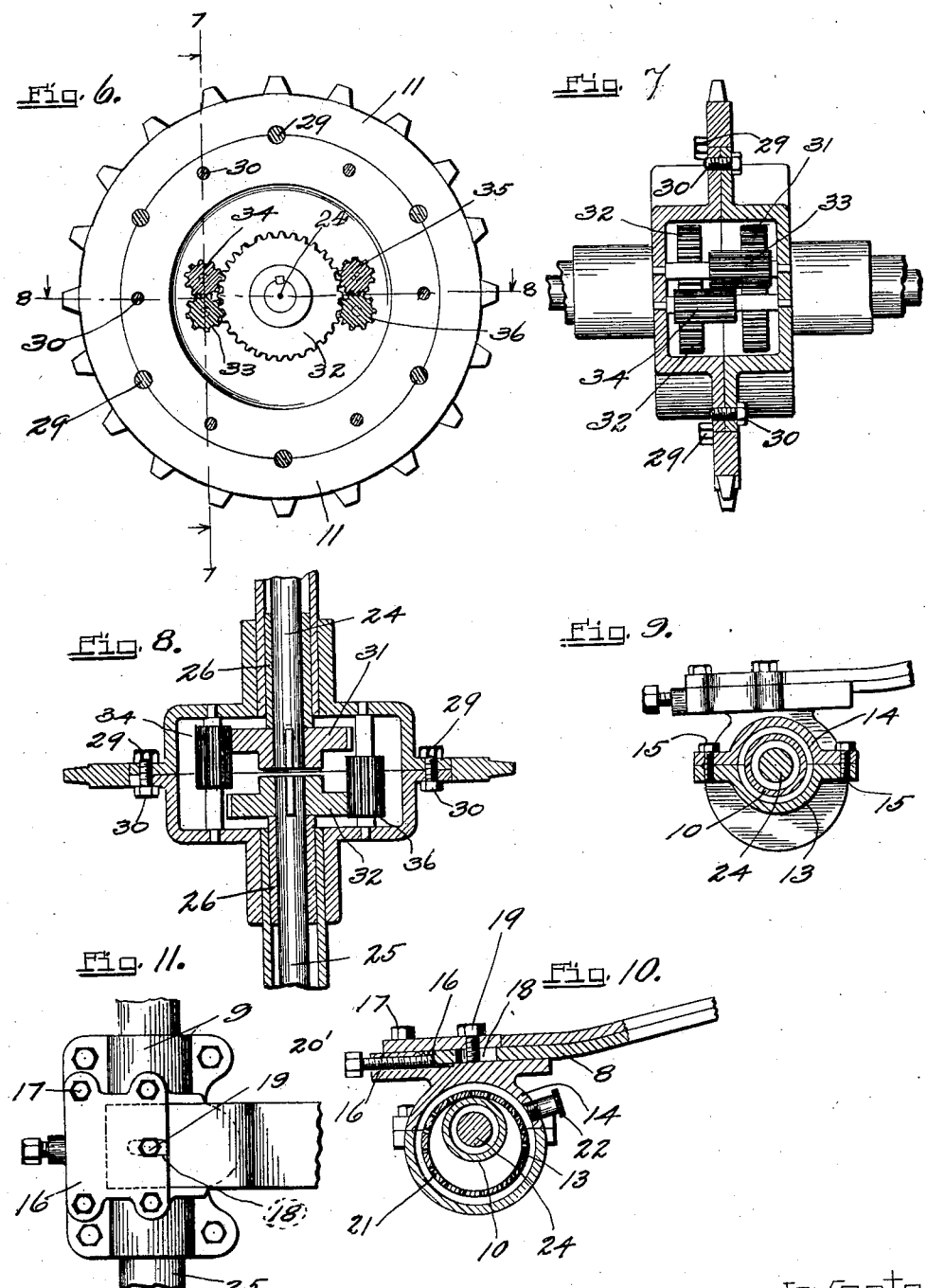

No. 734,080. Patented July 21, 1903.

UNITED STATES PATENT OFFICE.

WILLIAM MORRISON, OF CHICAGO, ILLINOIS, ASSIGNOR TO GEORGE RUMRILL CORYELL, OF CHICAGO, ILLINOIS.

REAR-AXLE CONSTRUCTION FOR AUTOMOBILES.

SPECIFICATION forming part of Letters Patent No. 734,080, dated July 21, 1903.

Application filed April 24, 1903. Serial No. 154,136. (No model.)

*To all whom it may concern:*

Be it known that I, WILLIAM MORRISON, a citizen of the United States of America, and a resident of Chicago, Cook county, Illinois, have invented a certain new and useful Improvement in Rear-Axle Construction for Automobiles, of which the following is a specification.

My invention contemplates a rear-axle construction adapted for use in connection with automobiles of various kinds and involving a novel arrangement of the gearing, axle, and bearings.

Generally stated, the object of my invention is to provide a simple and highly-efficient construction for the gearing, axle, and bearings.

A special object is to so combine a divided or two-part axle with a rigid or continuous outer tubular member in such manner as to give the axle structure as a whole the rigidity and strength of a continuous or one-piece axle.

Another object is to provide a simple and efficient construction of self-lubricating bearing for the said tubular member to turn in.

It is also an object to provide certain details and features of improvement tending to increase the general efficiency and serviceability of the gearing and rear axle of an automobile.

To the foregoing and other useful ends my invention consists in matters hereinafter set forth and claimed.

Figure 1:
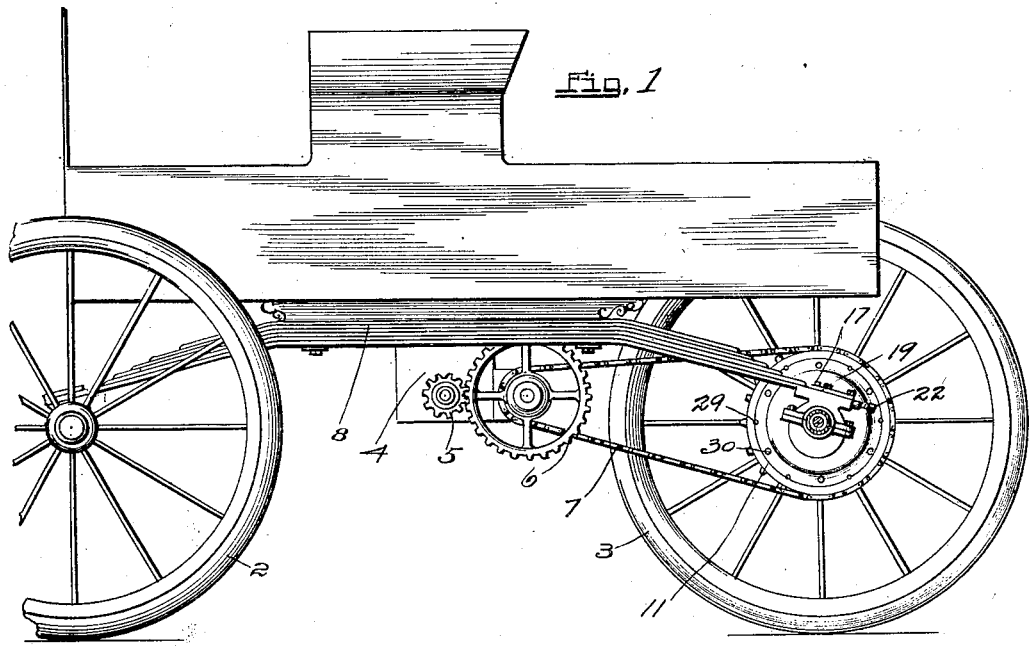
Figure 2:
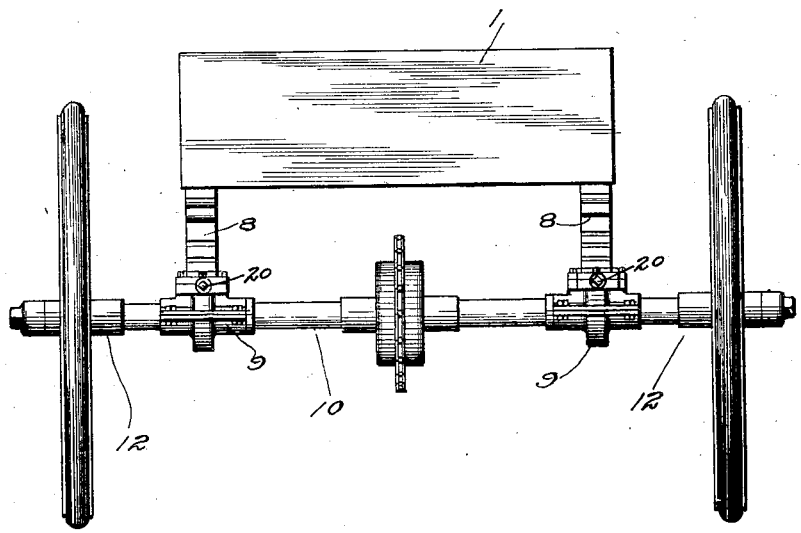

In the accompanying drawings, Figure 1 is a side elevation of an automobile embodying the principles of my invention. Fig. 2 is a rear elevation of the machine shown in Fig. 1. Fig. 3 is a view, partly in longitudinal section and partly in rear elevation, of the gearing, axle, bearings, and wheel-hubs shown in Fig. 2. Fig. 4 is a cross-section on line 4 4 in Fig. 3. Fig. 5 is a cross-section on line 5 5 in Fig. 3. Fig. 6 is a cross-section on line 6 6 in Fig. 3. Fig. 7 is a section on line 7 7 in Fig. 6. Fig. 8 is a section on line 8 8 in Fig. 6. Fig. 9 is a section on line 9 9 in Fig. 3. Fig. 10 is a section on line 10 10 in Fig. 3. Fig. 11 is a plan of the self-lubricating bearing shown in Figs. 9 and 10.

The automobile may be of any suitable or approved character and may be driven by any suitable motive power. For example and and as illustrated, it may involve a suitable body 1, supported by front and rear vehicle-wheels 2 and 3. The rear wheels can be driven by a suitable electric motor 4, the power being transmitted from the motor-shaft through the pinion 5 to the gear-wheel 6 and thence by sprocket-chain 7 to the rear axle. Preferably the body is connected with the wheels through the medium of a pair of side springs 8. The rear ends of the side springs are connected with the rear axle through the medium of the self-lubricating bearings 9, which latter constitute a part of my improved rear-axle construction. These bearings are supported on the rotary tubular member 10, which latter also constitutes part of my improved axle construction. The sprocket-chain 7 is arranged to engage and travel over a toothed ring or sprocket-wheel 11, which is secured to the middle portion of the said tubular member. The hubs 12 of the rear wheels 3 are mounted at the outer ends of the said tubular member.

Referring to Figs. 3, 9, 10, and 11, it will be seen that each bearing 9 is two-part in form, each consisting of a lower part 13 and an upper part 14, the two parts or halves being held together by bolts or screws 15. The upper part is provided with a cap-plate 16, which is held in place by bolts or screws 17 and which is adapted to seat over the rear end of the spring 8. The flat end of the spring is preferably provided with a slot 18, through which passes a bolt or screw 19, inserted through the plate 16. In order that the sprocket-chain may be readily tightened, each bearing is provided with an adjusting-screw 20, which bears against the rear end of the spring. By tightening these adjusting-screws the rear-axle structure can be shifted rearwardly to an extent to take up any undesirable slack in the chain. The two parts of each bearing are chambered sufficiently to accommodate a lubricating-ring 21, which is preferably provided with small openings or pockets for carrying the oil and which hangs on the rotary tubular member 10. Each bearing can be provided with an oil-cap 22, whereby oil can be supplied to the interior of each bearing, it being necessary to only fill each bearing to an extent to bring the surface of the oil to a level with the axis or center of the rotary tubular member. Endwise shift or displacement on the part of the axle is prevented by collars 23, which bear against the sides of the two bearings 9. Thus each of the two bearings in which the rigid and rotary tubular member turns is of a self-lubricating nature and is adapted to permit extensive use of the automobile without refilling.

The rear-axle construction also involves an inner two-part axle composed of the two axle-sections 24 and 25. These axle-sections constitute a divided or two-part axle, are of less diameter than the bore or interior diameter of the tubular member, and are arranged to rotate in sleeves or bushings 26. The wheel-hubs 12 are keyed or otherwise secured to the slightly-reduced outer end portions of these inner axle-sections, as shown in Fig. 3. Each wheel-hub preferably extends over the outer end portions of the tubular member, and packing 27 is interposed between the ends of the outer tubular member and the said hubs. At its center the said tubular member is preferably divided, its two ends being connected together by the two-part housing or hollow member 28. This housing constitutes an enlarged hollow portion of the said tubular member and is so applied and constructed as to render the said tubular member of a strong and rigid character from end to end. The toothed ring or sprocket-wheel 11 is mounted upon the peripheral portion of this housing and is held in place by bolts or screws 29. The two parts of the housing can be held together by bolts or screws 30. The said housing is designed and provided for the purpose of inclosing the differential gearing by which the two sections of the inner axle are connected. This differential gearing preferably comprises a pair of gear-wheels 31 and 32, mounted upon and keyed, respectively, to the axle-sections 25 and 24. A pair of small pinions 33 and 34 are mounted at one side of these gear-wheels, the pinion 33 engaging the gear-wheel 31, the pinion 34 engaging the gear-wheel 32, and the two pinions engaging each other. It will be observed that the two pinions are carried by the housing 28. A similar pair of pinions 35 and 36 are mounted at the other side of the two gear-wheels, the pinion 35 engaging the gear-wheel 32, the pinion 36 engaging the gear-wheel 31, and the two pinions engaging each other, and, as in the other case, the pinions 35 and 36 are carried by the housing 28. With this arrangement the outer and inner axle portions—that is to say, the outer tubular member and the inner axle, consisting of two solid axle-sections—will rotate in unison when the motor is driving the sprocket-chain and when the machine is running straight ahead; but with the provision of the differential gearing there will be more or less relative movement between the inner and outer axle portions and also between the outer axle portion or tubular member and the wheel-hubs when the machine turns to one side or turns around, so that at all times the construction has the advantages of a continuous and rigid rear axle and also the advantages of a divided or two-part axle.

The construction may be said to involve the combination of a rigid or one-piece axle with a divided or two-part axle, the latter being arranged within the former. In this way the rear-axle structure as a whole is strong and rigid from end to end, although driven at the center, like the ordinary two-part axle. It combines the advantages of the two types of axle and also presents certain other advantages which are peculiar to itself, and, as previously explained, the self-lubricating bearings 9, together with the axle thus constructed, constitute a simple and efficient medium of connection between the side springs and the rear vehicle or driving wheels.

What I claim as my invention is—

1. In an automobile, the combination of suitable motive power, a tubular member mounted to rotate in suitable bearings, power-transmitting connection between the middle portion of said tubular member and said motive power, a two-part inner axle inclosed within said tubular member, vehicle-wheels secured to the outer ends of said inner axle, and differential gearing between the two sections of the inner axle.

2. In an automobile, the combination of suitable motive power, a rotary tubular member mounted in suitable bearings, a sprocket-chain connection between said motive power and the middle portion of said tubular member, a two-part inner axle inclosed within said tubular member, vehicle-wheels secured to the outer ends of said inner axle, differential gearing between the two sections of the inner axle, and rotary lubricating-rings arranged within said bearings and encircling said tubular member.

3. In an automobile, the combination of suitable motive power, a pair of rear vehicle-wheels, and a rear-axle construction for said wheels, said axle construction including centrally-located differential gearing and a rigid rotary member extending from one wheel-hub to the other.

4. In an automobile, the combination of suitable motive power, a pair of rear vehicle-wheels, and a rear-axle construction for said wheels, said axle construction including centrally-located differential gearing and a rigid tubular member extending from one wheel-hub to the other, and a pair of self-lubricating bearings in which said tubular member is mounted for rotation, each bearing being provided with a rotary lubricating-ring adapted to rest upon and encircle the said tubular member.

5. In an automobile, the combination of suitable motive power, a pair of rear vehicle-wheels, a pair of side springs, a pair of bearings adjustably secured to the rear ends of said springs, a rigid tubular member mounted to turn in said bearings and extending from one wheel-hub to the other, differential gearing adapted and connected for permitting one wheel to travel faster than the other, and a power-transmitting connection between the said motive power and the middle portion of said tubular member.

6. In an automobile, a rear axle consisting of an outer rotary tubular member, an inner two-part axle, and differential gearing between the two sections of the inner axle.

7. In an automobile, the combination of an outer tubular axle, an inner two-part axle, differential gearing connecting the sections of said inner axle, power-transmitting connection for driving said axles in unison, and self-lubricating bearings in which the tubular axle is mounted, each bearing being provided with a rotary lubricating-ring adapted to rest upon and encircle said tubular axle.

Signed by me at Chicago, Cook county, Illinois, this 22d day of April, 1903.

WILLIAM MORRISON.

Witnesses:
   CHARLES HICKOK,
   WM. A. HARDERS.